United States Patent
Alhozaimy et al.

(10) Patent No.: US 8,293,006 B2
(45) Date of Patent: Oct. 23, 2012

(54) CEMENT/AGGREGATE COMPOSITION, CONCRETE PRODUCT AND METHOD FOR MAKING A CONCRETE PRODUCT

(75) Inventors: Abdulrahman M. Alhozaimy, Riyadh (SA); Mohd Saleh Jaafar, Serdang (MY); Abdulaziz I. Al-Negheimish, Riyadh (SA); Jamaloddin Noorzaie, Serdang (MY)

(73) Assignee: King Saud University, Riyadh (SA)

( * ) Notice: Subject to any disclaimer, the term of this patent is extended or adjusted under 35 U.S.C. 154(b) by 420 days.

(21) Appl. No.: 12/552,030

(22) Filed: Sep. 1, 2009

(65) Prior Publication Data

US 2011/0048287 A1    Mar. 3, 2011

(51) Int. Cl.
*C04B 7/00*    (2006.01)
(52) U.S. Cl. .................. 106/713; 106/737
(58) Field of Classification Search ............. 106/713, 106/737
See application file for complete search history.

(56) References Cited

U.S. PATENT DOCUMENTS

| | | | |
|---|---|---|---|
| 4,107,112 A | 8/1978 | Latta, Jr. et al. | |
| 4,207,116 A | 6/1980 | Been et al. | |
| 4,234,346 A | 11/1980 | Latta, Jr. et al. | |
| 4,371,639 A | 2/1983 | Muszynski | |
| 4,375,489 A | 3/1983 | Muszynski | |
| 4,376,831 A | 3/1983 | Woo | |
| 5,820,668 A | 10/1998 | Comrie | |
| 7,875,113 B2 * | 1/2011 | Hughes | 106/644 |
| 2005/0160946 A1 | 7/2005 | Comrie | |

* cited by examiner

*Primary Examiner* — Paul Marcantoni
(74) *Attorney, Agent, or Firm* — Lowe Hauptman Ham & Berner, LLP

(57) ABSTRACT

A concrete product is produced by providing red dune sand having a particle size of 45 microns or less and mixing the red dune sand with hydraulic cement in a ratio of about 30% of the cement being replaced by the red dune sand. The cement and red dune sand are then mixed with fine and course aggregate, water and a superplasticizer and cast after pouring into a mold cavity. Then within 24 hours of casting, the cast article is steam cured for 12 hours under atmospheric pressure, demolded and placed in an auto clave at 100% humidity. The temperature in the auto clave is raised to 180° C. within one to two hours and maintained at that temperature for 4 to 5 hours. The temperature also increases the pressure to about 10 bars. The pressure is released to reach atmospheric pressure within 20-30 minutes and the temperature reduced gradually, so that the article can be removed.

6 Claims, 1 Drawing Sheet

Concrete Strength of Different Mix and Curing

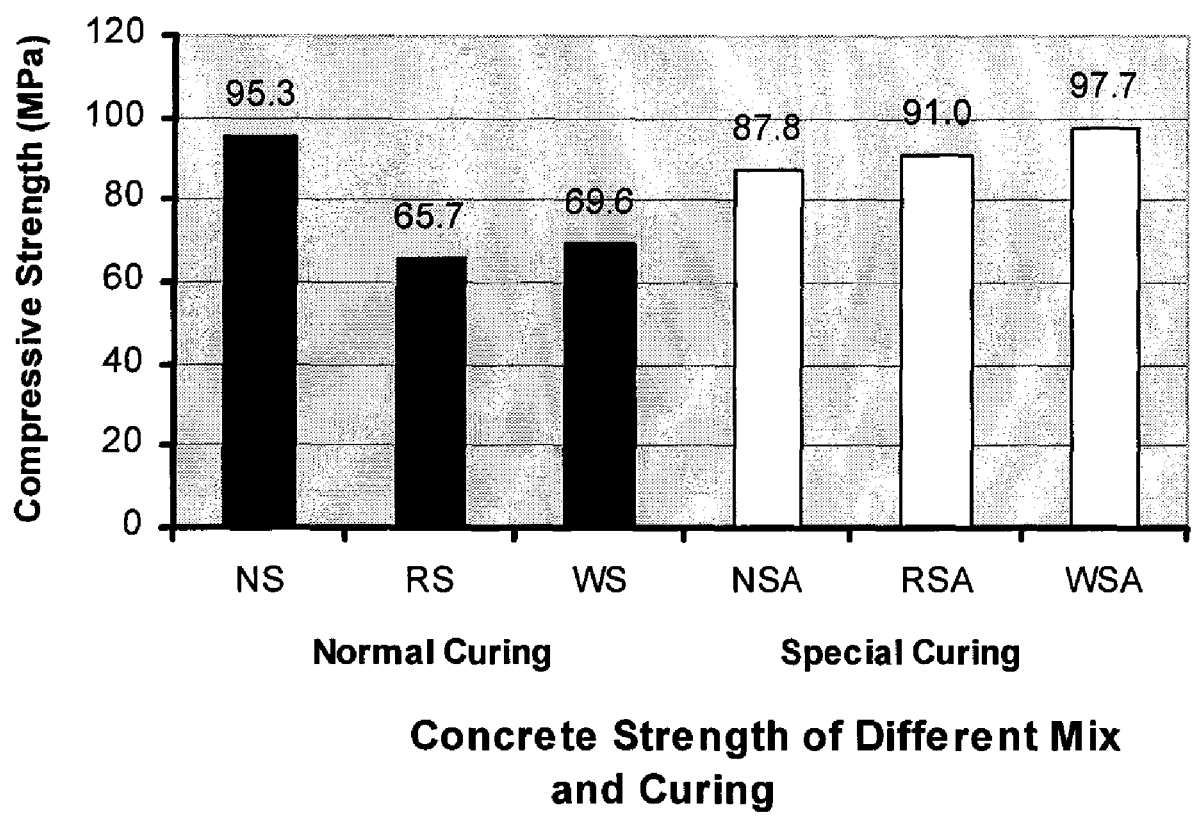

CEMENT/AGGREGATE COMPOSITION, CONCRETE PRODUCT AND METHOD FOR MAKING A CONCRETE PRODUCT

FIELD OF THE INVENTION

This invention relates to a cement/aggregate composition, concrete product and method for making a concrete product and more particularly to the use of a ground red dune sand having a particle size of 45 microns or less as a replacement of up to 30% of the cement.

BACKGROUND FOR THE INVENTION

Portland cement is one of the most important materials in the construction industry because of its multiple applications and chemical and physical properties. However, the costs and volume used are important factors that have lead to the search for new materials for replacing a part of the cement needed for such usage. The search for new materials has also led to a search for new materials that will lead to improved products.

General awareness in the 1980's of the deterioration of cement structures prompted many researchers to search for new materials which satisfy the strength criteria, but also the durability requirements. For example, researchers in the development of high performance cement (HPC) have made considerable progress. New constituents have been investigated and they are mostly from active silica (pozzolanic materials) that are obtained from natural deposits such as metakoalin or industrial waste such as fine silica fume, fly ash and ground blast furnace slag or agricultural waste such as rice husk ash.

In a sense, the pozzolanic materials have become very relevant due to their capacity to interact with the cement components and to improve its properties. The pozzolanics are siliceous or silica-aluminous materials that in themselves have little or no cementitious value, but in finely divided form and in the presence of moisture chemically react with calcium hydroxide at ordinary temperatures to generate compounds processing cementitious properties.

Pozzolanic materials such as silica fume and fly ash are considered to be basic materials for the production of HPC. However, as costs for these materials have increased and their availability threatens to pose problems for the sustainable production of certain concrete products. There is a need for less expensive materials for the partial replacement of cement in concrete products. It has also been recognized that civil construction applications such as roads, bridges, commercial and residential buildings, etc. that require significant amounts of cement based concrete would benefit from a lower cementitious material that reduces the demand for cement and dependency on the availability of pozzalonic materials.

Researchers have attempted to find cheaper and more readily available materials as partial replacements for cement. For example, a U.S. Pat. No. 5,820,668 of Comrie discloses an inorganic binder composition that may be used in partial substitution for Portland cement. The inorganic binder composition includes materials such as fly ash, $Al_2O_3$, pozzolan, ground slag, nephelene cyanite, anhydrous aluminum silicate, hydrous aluminum silicate, hydrous sodium hydroxide, silicic acid, potassium salt, and sodium salt.

A more recent Published Patent Application No. 2005/016096 of Comrie also discloses cementitious materials including stainless steel slag and geopolymer that can be added to conventional cement compositions, such as Portland cement as a partial or total replacement for conventional cement materials. The stainless steel slag may comprise silicates and/or oxides of calcium, silicon, magnesium, iron, aluminum, manganese, titanium, sulfur, chromium and/or nickel. The geopolymer may comprise aluminum silicate and/or magnesium silicate. In a preferred embodiment, curing of concrete materials by the action of water on the cementitious materials is enhanced with the addition of an activator component selected from calcium bromide, calcium nitrate, calcium nitrite, calcium chloride, calcium oxide, and sodium bromide.

Notwithstanding the above, it is presently believed that there is a need for and a potential commercial market for a cement/aggregate composition, concrete product and method for making a concrete product in accordance with the present invention. There should be a demand because such products blend up to 30% of the cement with a relatively low cost, naturally occurring material that is readily available in a relatively large amount.

BRIEF SUMMARY OF THE INVENTION

In essence the present invention contemplates a method for producing cast concrete products having a compressive strength of at least about 80 MPa from a cement/aggregate composition wherein about 30% of the cement has been replaced with red dune sand having a nominal particle size of 45 microns or less. The method comprises and/or consists of the following steps:

First, the red dune sand, as for example obtained in the vicinity of Riyadh Saudi Arabia, has or is milled to a particle size of 45 microns or less and the milled red dune sand is mixed with hydraulic cement preferably Portland cement in the ratio of up to about 30% of the cement being replaced by the red dune sand. The cement and red dune sand are mixed with fine and course aggregate, water and a superplasticizer selected from the group consisting of polycarboxylate ethers, polycarbonate, alkyl citrates, sulfinated naphthalene, sulfinated alene, sulfinated melamine, formaldehyde and the like. The wet mixture is cast by pouring into a mold and subsequently steam cured for 12 hours under atmospheric pressure within 24 hours of casting. The molded article is de-molded and placed in an auto clave or curing chamber at 100% humidity. The temperature is increased to between about 160°-200° C. to preferably about 180° C. within one to two hours and maintained at the selected temperature and a pressure of 10 bars with 100% humidity within the curing chamber for 4 to 5 hours. The pressure is released to reach ambient pressure within 20-30 minutes and the temperature reduced gradually.

In a preferred embodiment of the invention a cast concrete product is made from a cementitious mix containing the following ratio: Portland Cement 350 $Kg/m^3$, Milled red dune sand 150 $Kg/m^3$, Fine aggregate 650 $Kg/m^3$, Course aggregate 1165 $Kg/m^3$, Water 150 $Kg/m^3$, and 6 liters of superplasticizer and wherein the cast concrete product has compressive strength of at least about 85 to 100 MPas.

The invention will now be described in connection with the following figures wherein like numbers have been used to identify like steps.

DESCRIPTION OF THE DRAWINGS

FIG. 1 is a graph showing the relative compressive strengths of several mixes of concrete

DESCRIPTION OF THE PREFERRED EMBODIMENT OF THE INVENTION

This patent covers development and use of red dune sand as a partial cement replacement material in concrete products. It is well established that highly siliceous materials obtained from waste products such as fly ash and silica fume are effective cement replacement materials. They are, however becoming more expensive than cement itself, hence making it economically unattractive. Naturally occurring amorphous silica found in Turkey (Isparta Region) have been shown to enhance the properties of concrete and could be utilized as partial cement replacement materials (Davraz and Gunduz, 2005). Also, less reactive forms of silica such as ground quartz (silica flour) can act as a pozzolan under high pressure steam curing (Mindess, etal, 2003)). However, ground silica from sand dunes have not been tried or suggested as pozzolanic materials for concrete manufacturing. The only known utilization of dune sands in concrete mixtures is its use as a fine aggregate.

Preliminary analysis of red sand obtained from sand dunes around Riyadh, Saudi Arabia had been conducted and it was found that they have high silica content to entitle them as potential materials for partial cement replacement. Initial test results have shown that red sand obtained from sand dunes can be used as cement replacement in concrete manufacturing.

Concrete mixes of different categories were cast to determine the contribution of dune sand to the strength properties of concrete when used as partial cement replacement. The red sand was ground to small particles of less than 45 microns before it is used as cement replacement in concrete mixtures. Three different mixtures were as follows:

(a) Mix 1 (NS): contains normal concrete with only Ordinary Portland Cement, OPC (500 kg/m$^3$).

(b) Mix 2 (RS): contains OPC (350 kg/m$^3$) and ground red sand (dune sand, 150 kg/m$^3$).

(c) Mix 3 (WS): contains OPC (350 kg/m$^3$) and silica flour (150 kg/m$^3$)

The mixes were subjected to normal curing (water cured at room temperature) and special curing (steam curing at high temperature and pressure). Test results showed that there is no strength contribution for either ground red sand or silica flour for the concrete subjected to normal curing. However, a significant contribution to the strength was obtained with these materials when subjected to special curing. The materials used and comparison of the compressive strength for the mixes are shown in Table 1 and FIG. 1, respectively. The NS, RS and WS refer to Normal Mix, Red Sand Mix and Silica Flour Mix subjected to normal curing. The NSA, RSA and WSA refer to Normal Mix, Red Sand Mix and Silica Flour Mix subjected to special curing which include the following steps;

1. Specimens are steam-cured within 24 hours of casting for 12 hours under atmospheric pressure.

2. The specimens were then demoulded before being placed in the curing chamber. The humidity inside the curing chamber was maintained at 100% throughout the special curing period.

3. Specimens were put in a curing chamber (autoclaved) where the inside temperature was increased from ambient to 180° C. within 1-2 hours (this resulted in an equivalent increase in pressure to 10bar) 4. The temperature inside the curing chamber was maintained at 180° C. for 4-5 hours.

5. The pressure was released to reach atmospheric pressure within 20-30 minutes and the temperature reduced gradually The specimens were tested immediately after this curing process. Test results show that there is clear potential use of the red sand (dune sand) in concrete production. The process to transform the dune sand into partial cement replacement is less energy intensive than cement manufacturing and more environmentally friendly (no release of $CO_2$ into the atmosphere) The replacement of ordinary Portland cement by ground dune sand of up to 30% can be very economically attractive and will encourage wide utilization of dune sand in concrete manufacturing specially for precast concrete.

TABLE 1

Constituent materials for three different mixes

| | Mix 1 (NS) | Mix 2 (RS) | Mix 3 (WS) |
|---|---|---|---|
| Cement (kg/m$^3$) | 500 | 350 | 350 |
| Ground red sand (kg/m$^3$) | 0 | 150 | 0 |
| Silica Flour (kg/m$^3$) | 0 | 0 | 150 |
| Fine Aggregate (kg/m$^3$) | 650 | 650 | 650 |
| Coarse Aggregate (kg/m$^3$) | 1165 | 1165 | 1165 |
| Water (kg/m$^3$) | 150 | 150 | 150 |
| Superplasticizer (liter) | 6 | 6 | 6 |

A method for producing a cast concrete product having a compressive strength of at least about 85 MPa from a cement aggregate composition wherein up to about 30% of the cement has been replaced with milled red dune sand having an average particle size of less than 45 microns. The method comprises the steps of:

a) Milling red dune sand to reduce the particle size to less than about 45 microns;

b) Mixing the milled dune sand from step a. with cement, aggregate and water to produce a cement mix with about 3 parts dune sand to 7 parts cement;

c) Casting the cement mix in a predetermined shape by placing the cement mix in a mold to produce a molded article;

d) Within 24 hours of casting, steam curing the molded article for 12 hours under atmospheric pressure;

e) De-molding the molded article and placing the molded article inside a curing chamber and maintaining 100% humidity in the curing chamber;

f) Raising the temperature in the curing chamber to 180 degrees within 1 to 2 hours to thereby raise the pressure to 10 bars and maintaining the 180 degree C. temperature at 100% humidity within the curing chamber for 4 to 5 hours;

g) Releasing the pressure to reach atmospheric pressure within 20-30 minutes and the temperature reduced gradually;

A method for producing a cast concrete product from a cement/aggregate composition, said method consisting of the following steps:

a) Providing a mass of red dune sand with a particle size to 45 microns or less;

b) Providing a mass of Portland cement;

c) Mixing 70 parts Portland cement to 30 parts red dune sand;

d) Providing a mass of fine aggregate having a nominal particle size of 5 mm, and course aggregate having a nominal particle size of about 20 mm, water, superplasticizer;

e) Mixing the Portland cement red dune sand with the fine aggregate, course aggregate, water and superplasticizer to produce a mass of concrete;

f) Casting the mass of concrete in a predetermined shape by placing the cement mix in a mold to produce a molded article;

g) Within 24 hours of casting steam curing the molded article for 12 hours under atmospheric pressure;
h) Steam molding the molded article and placing the molded article inside a curing chamber maintaining 100% humidity in the curing chamber;
i) Raising the temperature in the curing chamber to 180 degrees C. within 1 to 2 hours to thereby raise the pressure to 10 bars and maintaining the 180 degrees C. temperature at 100% humidity within the curing chamber for 4 to 5 hours;
j) Releasing the pressure to reach atmospheric pressure within 20-30 minutes and the temperature reduced gradually;
k) Removing the cast product from the curing chamber;

While the invention has been described in connection with its preferred embodiments it should be recognized that changes and modifications may be made therein within departing from the scope of the appended claims.

What is claimed is:

1. A cementitious composition comprising:
    hydraulic cement in an amount of 300 to 400 Kg/m$^3$;
    red dune sand having reduced particle size of about 45 microns or less in an amount of 100 to 200 Kg/m$^3$;
    aggregate in an amount of 1600 to 2030 Kg/m$^3$ and wherein said aggregate is different than said red dune sand;
    a superplasticizer in an amount of 5 to 7 liters; and
    water to effect hydraulic setting of the cementitious compound in an amount of 100 to 200 Kg/m$^3$.

2. A cementitious composition according to claim 1 in which said red dune sand is provided in an amount of about 30 wgt % of said hydraulic cement.

3. A cementitious composition according to claim 2 in which said hydraulic cement is Portland cement.

4. A cementitious composition according to claim 3 and in which said cementitious composition made into a concrete product has a compressive strength of at least about 85 MPa.

5. A cast concrete product consisting of cement, ground red dune sand, fine aggregate, course aggregate, water and superplasticizer wherein the composition consists of the following ratio of ingredients:
    Portland cement in an amount of 350 Kg/m$^3$;
    ground red dune sand with an average particle size of less than about 45 microns in an amount of 150 Kg/m$^3$;
    fine aggregate in an amount of 650 Kg/m$^3$;
    coarse aggregate in an amount of 1165 Kg/m$^3$ wherein said red dune sand, fine aggregate and coarse aggregate are all different components;
    water in an amount of 150 Kg/m$^3$; and
    superplasticizer in an amount of 6 liters.

6. A cementitious composition according to claim 1 in which said aggregate includes an amount of 600 to 700 Kg/m$^3$ of fine aggregate with a particle size of about 5 mm and an amount of coarse aggregate with a particle size of about 20 mm in an amount of 1,000 to 1,330 Kg/m3.

* * * * *